(12) United States Patent
Decraene et al.

(10) Patent No.: US 10,530,686 B2
(45) Date of Patent: Jan. 7, 2020

(54) ROUTING METHOD REDUCING THE CONSEQUENCES OF MICROLOOPS

(71) Applicant: Transpacific IP Group Limited, Taipei (TW)

(72) Inventors: Bruno Decraene, Vanves (FR); Stephane Litkowski, Liffre (FR)

(73) Assignee: Transpacific IP Group Limited, Grand Cayman (KY)

( * ) Notice: Subject to any disclaimer, the term of this patent is extended or adjusted under 35 U.S.C. 154(b) by 0 days.

(21) Appl. No.: 15/966,162

(22) Filed: Apr. 30, 2018

(65) Prior Publication Data

US 2018/0248794 A1 Aug. 30, 2018

Related U.S. Application Data

(63) Continuation of application No. 14/898,464, filed as application No. PCT/FR2014/051637 on Jun. 26, 2014, now Pat. No. 9,985,880.

(30) Foreign Application Priority Data

Jun. 26, 2013 (FR) ...................................... 13 56144
Jun. 26, 2014 (WO) ................. PCT/FR2014/051637

(51) Int. Cl.
*H04L 12/723* (2013.01)
*H04L 12/733* (2013.01)

(52) U.S. Cl.
CPC .............. *H04L 45/50* (2013.01); *H04L 45/20* (2013.01)

(58) Field of Classification Search
CPC ......... H04L 45/50; H04L 45/02; H04L 45/20; H04L 45/22; H04L 45/28; H04L 45/74; H04L 47/125
See application file for complete search history.

(56) References Cited

U.S. PATENT DOCUMENTS 6,047,330 A * 4/2000 Stracke, Jr. ............. H04L 41/12
370/409
6,501,756 B1 * 12/2002 Katsube .................. H04L 45/00
370/352
(Continued)

OTHER PUBLICATIONS

International Search Report for the PCT/FR2014/051637 application.
(Continued)

*Primary Examiner* — Jamal Javaid
(74) *Attorney, Agent, or Firm* — Patents and Licensing LLC; Daniel W Juffernbruch; John G Fijolek

(57) ABSTRACT

The invention concerns a method for routing a packet in a packet switching network in disconnected routing mode, implemented by a router, comprising the following steps: —receiving (E1) the packet; —reading (E2) a field, called the longevity field of the packet, intended to be decremented when traversing a router; —decrementing (E5) the value of the longevity field using a step of a predefined value, called the decrementation step; —deciding (E6) on the routing of the packet on the basis of the value of the decremented longevity field, the packet being destroyed (E7) when said value is less than or equal to zero; the method further comprising, prior to the step of decrementing, the following steps: —obtaining (E3) at least one item of information from a group of items of information comprising an item of information relative to routing conditions of the packet and an item of information relative to parameters of the packet; —determining (E4) the value of the decrementation step on the basis of at least the obtained information.

12 Claims, 2 Drawing Sheets

(56) References Cited

U.S. PATENT DOCUMENTS 6,728,220 B2    4/2004  Behzadi
7,355,978 B2    4/2008  Fontana

OTHER PUBLICATIONS

Agarwal Brocade B Akyol Cisco Systems P: "Time to Live (TIL) Processing in Multi-Protocol Abel Switching {MPLS) Network", Jan. 1, 2003, XP015009226.
Defense Advanced Research Projects Agency Information Sciences Institute University of Southern California, "Internet Protocol DARPA Internet Program Protocol Specification; rfc 791.txt", Sep. 1, 1981.
Shand S. Bryant Cisco Systems M., "A Framework for Loop-Free Convergence;rfc5715.txt", Jan. 15, 2010, XP015068152.
Shand S. Bryant Cisco Systems M., "IP Fast Reroute Framework;rfc5714.txt", Internet Engineering Task Force Jan. 15, 2010, pp. 1-15.
Shand Individual Contributor S Bryant, Framework for Loop-free convergence using oFIB:Internet Society Geneva, May 24, 2013, pp. 1-27.
Written Opinion for the PCT/FR2014/051637 application.

\* cited by examiner

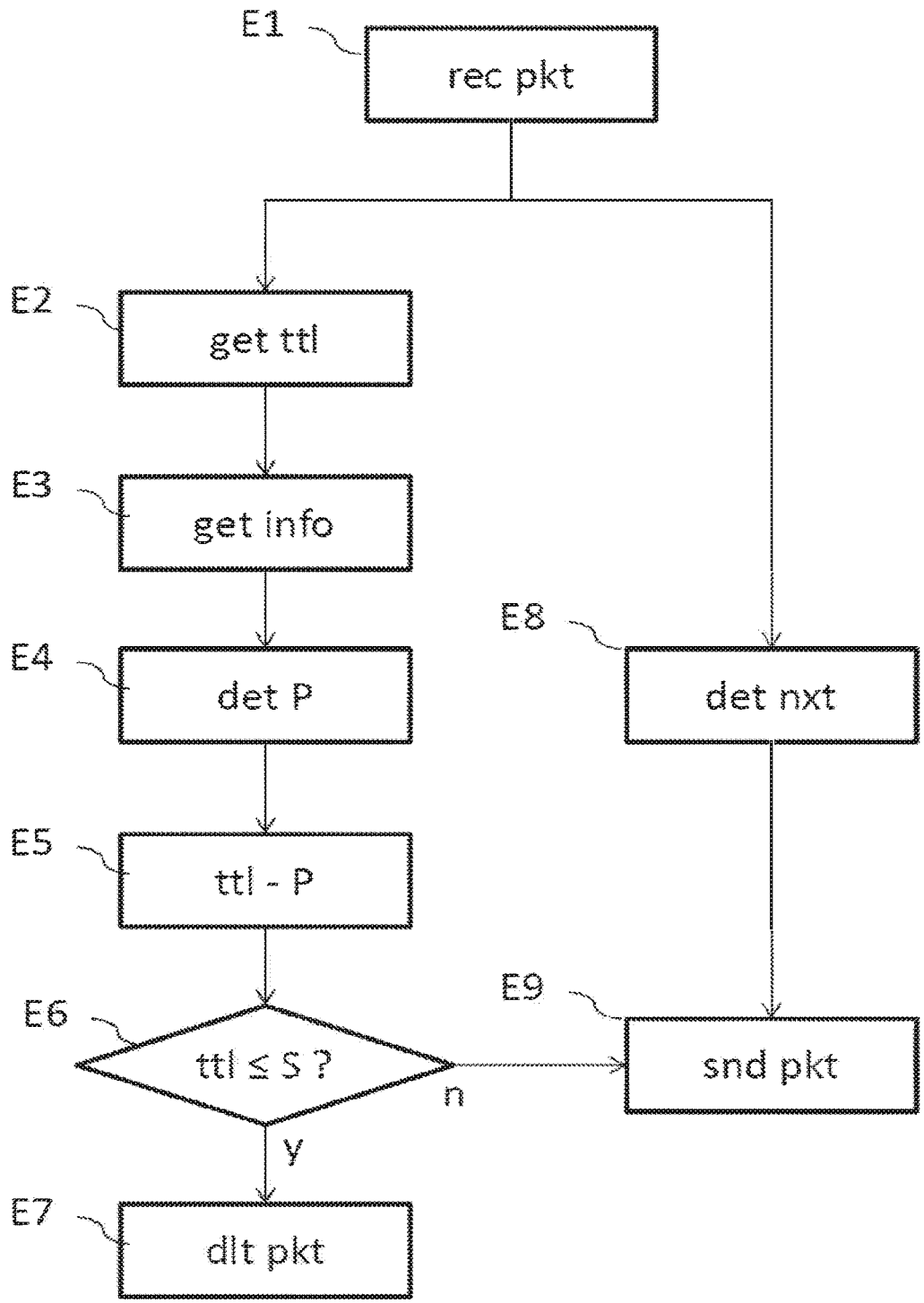

ROUTING METHOD REDUCING THE CONSEQUENCES OF MICROLOOPS

1. FIELD OF THE INVENTION

The patent application relates to the field of telecommunications, and more particularly to networks of IP (Internet Protocol) and MPLS (Multi-Protocol Label Switching) packets.

2. PRIOR ART

The invention falls in the context of IP and MPLS networks composed of routers transporting IP or MPLS packets and routing these packets, from hop to hop, along a route to their destinations.

When the state of the network is modified, each router modifies its switching tables (FIB, for forwarding information base) in a non-chronologically ordered manner. For this reason, during the re-routing operations following a failure of a link or router, a re-establishment of a link or of a router, or a change of metric used by the routers for the calculation of the routes, not all the routers install the new routes in their switching table exactly at the same time. Consequently, temporary switching loops, or "microloops", may occur between a router using an old route and a neighboring router using the new route.

This microloop phenomenon is illustrated in FIG. 1, where the router A sends a packet toward B whose final destination is the router C. The router B detecting a fault in the link between itself and the router C updates its routing table and decides to re-route the packet via a new route going through the router A, in order for the packet to be able to reach the router C despite the fault. However, as long as the router A has not updated its routing table for getting to the destination C, the router A will cause the packet sent back by the router B to turn around. The packet therefore carries out a series of about-turns between the routers A and B, for as long as the routing tables for the two routers have not been updated, creating the microloop. It should be noted that, depending on the topologies, microloops may involve a number of routers greater than 2, for example a triangle formed from the routers A, B, D, or a square formed from the routers A, B, C.

In order to prevent these packets from circulating indefinitely within the network while using its resources (bandwidth), a known solution is to assign a limited lifetime to a packet, indicated in a field of the packet and initially fixed at a predetermined maximum integer value. This value such as defined in RFC 791 corresponds, in theory, to the maximum lifetime of the packet within the network, measured in seconds. However, for reasons of implementation, this value corresponds, in practice, to a number of hops or of routers traversed.

For example, in IPv6 this lifetime field is called Hop Limit and in IPv4 or in MPLS, it is called TTL (Time To Live).

At each hop, the lifetime field is decremented by 1. Once the value 0 has been reached, the packet is destroyed.

The current method allows a microloop to be effectively eliminated, but a first drawback is that it is very slow, which leads to a saturation of the interfaces for a substantial interval of time, in other words of the order of 200 ms to 4 s in a network with a reasonable level of performance. These time intervals were acceptable when the Internet was created, but are no longer acceptable these days because of the performance levels expected from the current networks.

A second drawback of this method is that it treats all the packets in the same manner, irrespective of their importance or of their probability of being in a microloop. In particular, during the decrementation, it makes no distinction when a packet makes an about-turn, whereas this is a suspicious behavior which should not occur if the routing were coherent. Thus, the microloops, which are typically successions of about-turns, are not significantly penalized. For example, a terminal such as a PC running under Windows XP sends out IP packets with a TTL equal to 128 ("Default TTL"). After passing through 8 routers, in other words the equivalent of traversing a country such as France, the packet may loop 60 times between two routers, with an identical multiplying effect (by 60) on the flow rate of the traffic sent into the loop between these two routers, which has the typical effect of saturating the interface.

The Internet-Draft document of the IETF "draft-ietf-rtgwg-ordered-fib-12", published on the 25 May 2013, discloses a solution to the problem of microloops which consists in sequentially ordering the updating of routing tables that each of the routers affected by the re-routing operations has to carry out, so as to avoid the appearance of microloops. One drawback of this solution is that it requires a centralized intelligence and new management functions in the control plane of the network. Moreover, it is not capable of eliminating the microloops in all cases, in particular when there is a succession of several faults.

One of the aims of the invention is to overcome these drawbacks of the prior art.

3. PRESENTATION OF THE INVENTION

The invention will improve the situation by means of a method for routing a packet within a packet switching network in non-connected routing mode, implemented by a router, comprising the following steps:
  receiving the packet;
  reading a field, called lifetime field, of the packet, intended to be decremented when passing through a router;
  decrementing the value of the lifetime field by a pitch of predetermined value, called decrementation pitch;
  decision on routing the packet depending on the value of the decremented lifetime field, the packet being destroyed when said value is less than or equal to zero;
the method furthermore comprising, prior to the decrementation step, the following steps:
  obtaining at least one piece of information from amongst a group of pieces of information comprising information relating to conditions for routing the packet and information relating to parameters of the packet;
  determining the value of the decrementation pitch depending at least on the information obtained.

In a packet switching network in non-connected routing mode, each router receiving a packet must decide which will be the next router toward which the packet is to be sent. Each time a router is traversed, the lifetime field of the packet is decremented. This field can represent a quantity of time remaining to the packet before being destroyed but, in practice, it actually represents a number of passages through routers, or of hops between routers, remaining to be carried out before the packet is destroyed or halted. In contrast to the prior art where the decrementation pitch is constant and equal to one, the routing method according to the invention allows the pitch to be adapted according to the routing conditions.

By virtue of the invention, if routing conditions are not favorable, the value of the pitch can be increased, which then shortens even faster the lifetime of the packet, and hence the period of time during which it occupies the resources of the network in an inefficient manner. The invention therefore allows the value of the pitch to be dynamically adapted to the routing conditions.

According to one aspect of the invention, the information obtained comprises an input interface of the router for the packet and an output interface of the router for the packet and, when the output interface is identical to the input interface, a situation referred to as an about-turn, the value of the pitch is augmented.

In the sense of this application, an interface should be understood to mean one or more interfaces connected to the same neighboring router. Indeed, certain routers may have several parallel interfaces connected to the same router.

Referring again to FIG. 1 by way of illustration, when a packet sent by the router A is received by the router B, and when the router B, calculating with the aid of its routing table the route that the received packet has to take, determines for the packet an output interface identical to the input interface, this means that the packet makes an about-turn in order to return to the router A. It is therefore likely, in this case, that the packet will make another about-turn in order to return to the router B when it passes for a second time through the router A, since the routing table for the router A has already sent the packet to the router B and has probably not had the time to be modified in the meantime. As long as the routing tables for the router A and for the router B have not been updated in a coherent manner, the switching of the packet is not modified, and the latter makes return trips between the two routers then forming what is known as a microloop.

By virtue of this aspect of the invention, in the case of an about-turn, symptomatic of a microloop, the value of the lifetime field is decreased in order to limit the number of about-turns. If the packet is effectively trapped in a microloop, it will be destroyed more quickly. If the packet is not trapped in a microloop and the about-turn is isolated, the packet is only penalized once before continuing on its way toward its destination.

According to one aspect of the invention, the augmented value of the pitch is determined as being equal to at least the maximum value of the lifetime field, divided by a predetermined number of about-turns permitted for the same packet.

Thanks to this aspect of the invention, in the case of an about-turn, symptomatic of a microloop, the value of the lifetime field is decreased by a decrementation pitch that is sufficiently high to limit the number of about-turns to an acceptable number, irrespective of the maximum value that the lifetime field can take within the network.

According to one aspect of the invention, the information obtained comprises a cost associated with an output interface of the router, and the value of the pitch is determined as being proportional to the cost.

Thus the use of costly links by the router is penalized to a greater degree.

According to one aspect of the invention, the cost associated with the output interface is a function at least of one parameter included within the group comprising:
 delay of a link associated with the output interface;
 bandwidth of the link;
 jitter of the link;
 loss of packets from the link;
 maximum size of a packet permitted on the link;
 a value configured by the operator of the network.

The lower the performance of a link, the more its use by packets can become problematic. The link delay, for example, is a parameter associated with the link which is of particular interest because the shorter the delay, the more rapidly the traffic grows in the case of a microloop, and hence has a greater chance of saturating the interface before a re-routing process eliminates the microloop.

Advantageously, during the step for obtaining, in the routing procedure, the router may obtain several pieces of information, then combine them during the step for determining the value of the decrementation pitch. For example, if an about-turn is detected and if the link delay associated with the output interface is very short, the value of the pitch will not only be calculated such that a maximum number of about-turns is not exceeded, but will moreover be augmented. This will have the effect of reducing even more the number of about-turns that the packet is permitted when these about-turns are particularly damaging for the link.

According to one aspect of the invention, the value of the pitch determined is increased if the link associated with the output interface is a tunnel whose destination is not a router directly neighboring the router.

Thus, the value of the decrementation pitch is increased for the destinations for which a rule referred to as "FRR" (FastReRoute) is activated. When an FRR rule is active, this means that the router has detected a fault on a link to a neighboring router and that it has decided to reroute the traffic without warning other routers of the existence of the fault. In general, the router applies an FRR toward a router which, on the one hand, is not a direct neighbor, by means of a tunnel for example, and, on the other hand, from which it knows that the traffic will not be sent back. Indeed, a loop may nevertheless be formed between three routers or more, in the case of a fault that is more serious than anticipated by the router, involving for example more than one link.

A certain number of these types of loops may however be permitted in the same manner as for the microloops.

According to one aspect of the invention, the information obtained comprises a first distance between a preceding router and a final destination router of the packet, and a second distance between the router and said final destination router, and the value of the pitch determined is increased if the first distance is less than the second distance.

Thus, the use of a non-optimal route which makes the packet get further from its destination router is penalized more heavily.

This option is relevant in the case of VPN MPLS (Virtual Private Network) networks using tunnels to destinations routed by a routing protocol such as the IGP (Interior Gateway Protocol), which declare the destination and which therefore allow these two distances to be calculated locally.

According to one aspect of the invention, the information obtained is a service class included within at least one field of the packet.

Thus the priority of the packet, which depends on its service class, is used to determine the value of the decrementation pitch. This service class of the packet is typically indicated within the packet in a field of type DiffServ, EXP, Traffic Class, IP Precedence, TOS or equivalent. For example, a packet whose service class is of the type "best effort" (in other words for an undifferentiated Internet service) will have a larger decrementation pitch than that of a packet whose class is more important.

Conversely, for certain classes of high priority traffic, it could be chosen to increase the decrementation pitch very significantly. For example, for the classes of traffic very sensitive to jitter, such as real-time services such as voice, video, or clock synchronization protocols, for which a loss of a packet is preferable to a lengthening of the time taken, which extra time would be for example due to a micro-loop.

According to one aspect of the invention, the information obtained is a type of protocol used by one of the layers of the packet.

Thus, the traffic having the least value for the client or for the operator would be penalized first. For example, if the protocol of the application layer of the packet is a protocol of the "peer-to-peer" type, the value of the decrementation pitch will be higher than that of the pitch where this protocol is "http".

According to one aspect of the invention, the information obtained is the lifetime field of the packet received, and the value of the pitch is determined as a function of the value of the field.

Thus, the value of the decrementation pitch depends on the value of the lifetime field received. For example, by taking a pitch equal to half of the value of this lifetime field, this allows a faster decrease in the lifetime field than in the prior art, where the decrementation pitch is only one unit. A faster decrease is useful, for example, when the size of the network traversed is not large, and when the initial value assigned to the lifetime field is large.

The various aspects of the routing method which have just been described may be implemented independently from one another or in combination with one another.

The invention also relates to a device for routing a packet within a packet switching network in non-connected routing mode, implemented by a router comprising the following modules:
    receiving the packet;
    reading a field, called lifetime field, of the packet, intended to be decremented when passing through a router;
    decrementing the value of the lifetime field by a step of predetermined value, called decrementation pitch;
    decision on routing the packet depending on the value of the decremented lifetime field, the packet being destroyed when said value is less than or equal to zero;
the device furthermore comprising the following modules:
    obtaining at least one piece of information from amongst a group of pieces of information comprising information relating to conditions for routing the packet and information relating to parameters of the packet;
    determining the value of the decrementation pitch depending at least on the information obtained.

Such a device implements the steps of the routing method such as previously described.

The invention also relates to a router designed to route packets within a communications network in non-connected mode, comprising a routing device such as that which has just been described.

The invention also relates to a computer program comprising instructions for implementing the steps of the routing method which have just been described, when this method is executed by a processor.

Finally, the invention relates to a recording medium, readable by a router, on which the program that has just been described is recorded, which program is able to use any given programming language, and to take the form of source code, object code, or of code intermediate between source code and object code, such as in a partially compiled form, or in any other desired form.

4. PRESENTATION OF THE FIGURES

Other advantages and features of the invention will become more clearly apparent upon reading the following description of particular embodiments of the invention, presented simply by way of illustrative examples which are non-limiting, and of the appended drawings, amongst which:

FIG. 2 shows one examplary embodiment of the routing method according to a general embodiment of the invention.

5. DETAILED DESCRIPTION OF AT LEAST ONE EMBODIMENT OF THE INVENTION

In the following part of the description, examples of several embodiments of the invention based on MPLS are presented, but the invention is also applicable to other packet switching networks such as IPv4 or IP v6.

Figure 1:
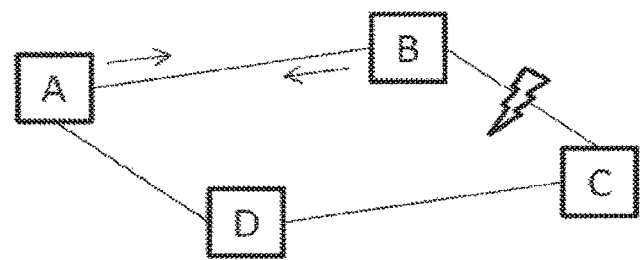
FIG. 1 shows schematically the phenomenon of a micro-loop between two routers.

FIG. 1 has already been the object of explanations and will not be further developed. In the following, unless otherwise stated, the reader is positioned from the point of view of the router B.

FIG. 2 shows one example of implementation of the routing method according to a general embodiment of the invention.

During a known step E1, the router receives a packet on an interface I1.

During a known step E2, the router reads the field TTL of the received packet.

During a step E3, the router obtains at least one piece of information relating to the routing conditions applicable to the packet, and/or relating to a parameter included within the packet.

The sequential order between the steps E2 and E3 may be reversed.

During a step E4, the router determines, as a function at least of the one or more pieces of information obtained, the value of a decrementation pitch P to be applied to the field TTL.

During a step E5, the router decrements the field TTL of the packet by subtracting P from the value of the field TTL.

During a decision step E6, the new value of the field TTL is compared with a threshold S, which may be fixed at zero.

If the field TTL is less than or equal to S, the packet is destroyed during a step E7, and is not therefore routed toward its final destination.

Following the step E1 for receiving the packet, and prior to the step E4 for determining the pitch, the router also determines, during a known step E8 which may be before or after the step E3, from which output interface, in other words toward which next router the packet is to be sent, by means of a routing table and depending on the final destination of the packet.

If, during the decision step E6, the field TTL is greater than the threshold, the packet is routed, during a known step E9, toward the next router determined during the step E8.

In a first particular embodiment of the invention, the decrementation step P is determined as a function of the occurrence of an about-turn performed by the packet.

The step E1 is followed by a recording step E11 of the input interface I1 of the packet.

The step E3 of the general embodiment is replaced by a step E31 of obtention of the output interface I2 and of the input interface I1. Obtaining the output interface is carried out by means of the step E8. Obtaining the input interface is carried out by means of the step E11.

The step E4 of the general embodiment is replaced by a step E41 for determining the value of the decrementation pitch, comprising a step E412 for detection of an about-turn. If the interfaces I1 and I2 are identical, in other words if they connect the router to the same neighboring router, this indicates the occurrence of an about-turn. In this case, the decrementation pitch P is increased and may for example be calculated in the following manner:

$$P=INT(TTLmax/DMmax)$$

where TTLmax represents the maximum value that the field TTL of the packet can take, and DMmax represents the maximum number of about-turns that it is desired to allow for this packet.

During a step identical to the step E5 of the general embodiment, the field TTL is decreased by P. If the result is higher than the threshold, the packet is routed toward the next router, which is the same as the preceding router.

The preceding router, receiving the same packet that it has just sent, and applying the same procedure, will also decrease the field TTL by the same value P, before again sending back the same packet to the same original router.

Thus, if the packet is initially received with a value of the field TTL equal to TTLmax, it will be understood that the packet will perform, at the most, DMmax one-way trips between the two routers, in other words (DMmax-1) about-turns, before the value of the field TTL passes the threshold beyond which the packet is destroyed.

According to the prior art, the number of about-turns may be very large, forming what is called a microloop, and may consume all the bandwidth between the two routers for the whole duration of the microloop, because the lifetime field is only decremented by one unit at each passage in a router.

Indeed, for example in a context where the value of TTLmax is 255 (initial value used for a packet sent out by a terminal device under Unix, furthermore equal to the maximum value of this field which is 8 bits long), the prior art allows up to 254 about-turns between two routers before the destruction of the packet. Thanks to the invention, if the value of DMmax is 3, the decrementation step is fixed at 255/3, in other words 85, in order to guarantee the destruction of the packet, and the end of the microloop, after 3 about-turns. Thus, the negative effects of the microloops on the bandwidth are eliminated, but without a small number of about-turns being completely prohibited, which may be justified and necessary in certain cases.

In a second particular embodiment of the invention, the decrementation pitch P is determined as a function of a cost of a link to the next router.

The step E3 of the general embodiment is replaced by a step E32 for obtaining the output interface I2 and by a cost C associated with this interface.

The step E4 of the general embodiment is replaced by a step E42 for determining the value of the decrementation pitch P, where P is calculated for example in the following manner;

$$P=INT(Pmin+((Pmax-Pmin)/(Cmax-Cmin))*(C-Cmin))$$

where Pmax and Pmin respectively represent the maximum and minimum values that the value of the pitch P can take, Cmax and Cmin respectively represent the maximum and minimum values that the cost associated with an interface of the router can take, and C represents the cost associated with the interface I2.

In this example, P is linearly proportional to C, but any other relationship is possible, linear or otherwise, between P and C.

Thus, the higher the cost of the link taken by the packet, the closer the value of P is to Pmax, the more the packet is penalized, and the less time that it is given for occupying costly resources of the network before arriving at its destination or before being destroyed.

The cost associated with the output interface I2 can be predetermined, or calculated, as a function of a link delay associated with the output interface, of its bandwidth, or of any other performance metric of the link, or of a combination of these criteria.

In a third particular embodiment of the invention, the decrementation step P is determined depending on whether a tunnel to the next router is used or not.

The step E3 of the general embodiment is replaced by a step E33 for obtaining the output interface I2 and the type of link associated with this interface.

If the type of link indicates that it is a tunnel, in other words the packet must be encapsulated within another packet which is designed to be sent to a specific destination of the network, the step E4 of the general embodiment is replaced by a step E43 for determining the value of the decrementation pitch P, or P is augmented by a predetermined quantity.

Thus, the more the packet uses tunnels, the faster the value of the field TTL decreases, the more the packet is penalized, and the shorter the time it is given for occupying the costly resources of the network, such as tunnels, before arriving at its destination or being destroyed.

In a fourth particular embodiment of the invention, the decrementation step P is determined according to distance of the packet location from its final destination.

The step E3 of the general embodiment is replaced by a step E34 for obtaining a first distance d1 between the preceding router and the final destination of the packet, and a second distance d2 between the router and the final destination of the packet.

If d1 is less than d2, in other words if the packet, going via the router, is getting further away from its final destination, the step E4 of the general embodiment is replaced by a step E44 for determining the value of the decrementation pitch P, where P is augmented by a predetermined quantity.

Thus, the further the packet gets from its final destination, which is a suspicious behavior, the faster the value of the field TTL decreases, the more the packet is penalized, and the shorter the time it is given for occupying inefficiently the resources of the network before arriving at its destination or being destroyed.

In a fifth particular embodiment of the invention, the decrementation step P is determined according to the service class of the packet.

The step E3 of the general embodiment is replaced by a step E35 for obtaining the value of the field "service class" of the packet.

The step E4 of the general embodiment is replaced by a step E45 for determining the value of the decrementation pitch P, where P is a function of the priority of the service class obtained.

Thus, the lower the priority of the packet, the faster the value of the field TTL decreases, the more the packet is penalized, and the less time it is given for occupying resources of the network to the detriment of higher priority packets, before arriving at its destination or being destroyed.

In a sixth particular embodiment of the invention, the decrementation pitch P is determined as a function at least of one of the communications protocols used by the packet.

The step E3 of the general embodiment is replaced by a step E36 for obtaining the type of protocol used by one of the OSI layers for the packet, or several of the types of protocol used by several of the layers.

The step E4 of the general embodiment is replaced by a step E46 for determining the value of the decrementation pitch P, or P depends on the preference accorded by the operator of the network to the traffic using the protocol or the combination of protocols obtained.

Thus, the lower the value of the stream to which the packet belongs, the faster the value of the field TTL decreases, the more the packet is penalized, and the shorter the time it is given for occupying the resources of the network to the detriment of packets belonging to streams with more value, before arriving at its destination or before being destroyed.

In a seventh particular embodiment of the invention, the decrementation pitch P is determined as a function of the value of the field TTL of the packet received.

The step E3 of the general embodiment is eliminated.

The step E4 of the general embodiment is replaced by a step E46 for determining the value of the decrementation pitch P, or P is proportional to the value of the field TTL of the packet.

Thus, the higher the value of the field TTL, the faster it decreases, the more the packet is penalized, and the shorter the time it is given for occupying the resources of the network, before arriving at its destination or before being destroyed.

The particular embodiments which have just been described may be combined with one another. In particular, it has been seen that it was advantageous to combine the first with the second embodiment, in order to penalize the packet if an about-turn is detected, and to penalize it even more strongly if the about-turn is performed on a high-speed link. The reader will understand that the scope of the invention is not limited to this combination, but encompasses all the possible combinations between at least two embodiments.

Figure 3:
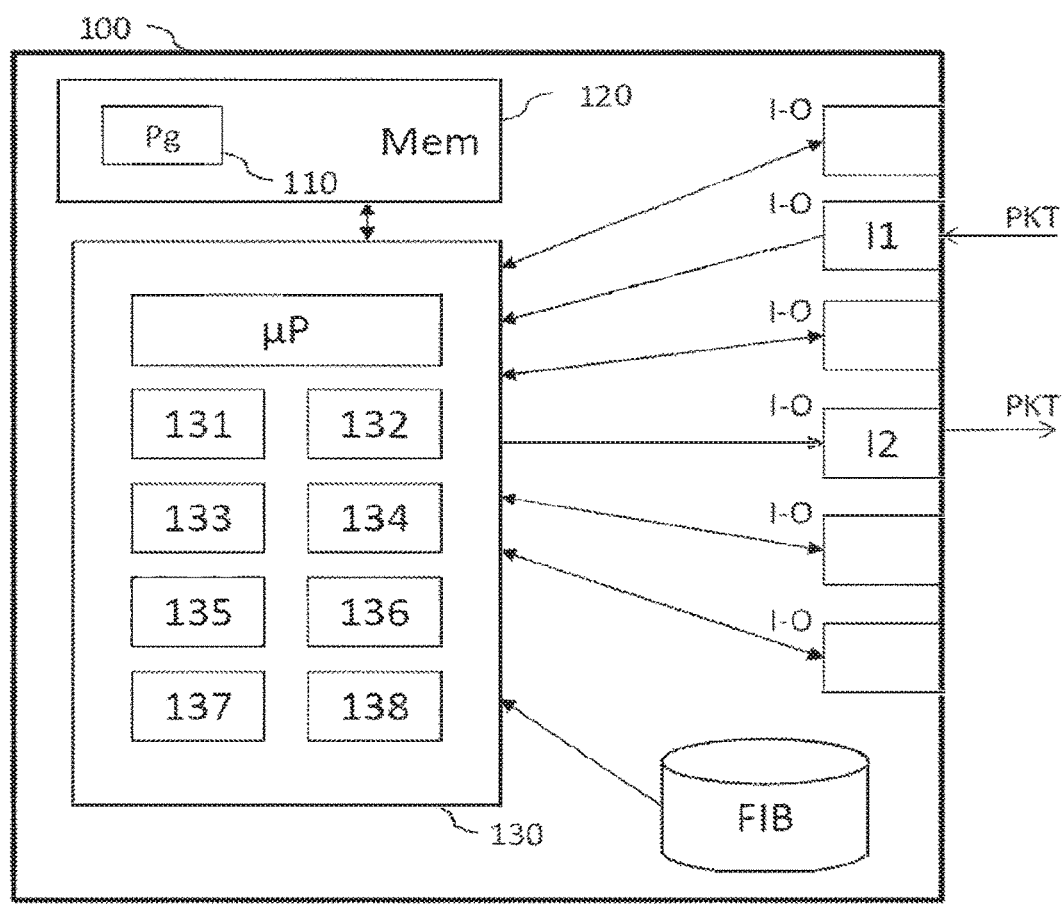
FIG. 3 shows one example of a structure of a routing device, according to one aspect of the invention.

With reference to FIG. 3, one example of a structure of a routing device, according to one aspect of the invention, is now presented.

The routing device 100 implements the routing method of which various embodiments have just been described.

Such a device 100 may be implemented in a router designed to route packets within packet switching communications networks.

For example, the device 100 comprises a processing unit 130, equipped for example with a microprocessor μP, and controlled by a computer program 110 stored in a memory 120 and implementing the routing method according to the invention. Upon initialization, the code instructions of the computer program 110 are for example loaded into a RAM memory, before being executed by the processor of the processing unit 130.

Such a device 100 comprises:
a receiver module 131, designed to receive a packet PKT via an interface I1 of the router,
a read module 132, designed to read the value of the lifetime field of the received packet,
an acquisition module 133, designed to obtain at least one piece of information from amongst a group of pieces of information comprising information relating to conditions for routing the packet and information relating to parameters of the packet,
a determination module 134, designed to determine the value of a decrementation pitch depending at least on the information obtained,
a decrementation module 135, designed to decrement the value of the lifetime field by means of the decrementation pitch determined,
a decision module 136, designed to decide on the routing of the packet depending on the value of the decremented lifetime field,
a destruction module 137, designed to destroy the packet when the value of the decremented lifetime field is less than or equal to zero,
an emission module 138, designed to send out the packet via an interface I2 of the router when the value of the decremented lifetime field is greater than zero.

Such a device 100 may also comprise:
a input/output interfaces I-O, comprising the interfaces I1 and I2, designed to send packets over the link with which they are associated, and to receive packets from this link, each link connecting the router to another router,
a routing table FIB designed to supply the information needed to determine the output interface for a received packet.

The modules described with reference to FIG. 3 may be hardware or software modules.

The exemplary embodiments of the invention which have just been described are only a few of the embodiments that may be envisioned. They show that the invention provides not only a solution to the problem of microloops within a communications network, but to any problem due to the excessively long circulation of a packet within the network before it arrives at its destination or before its destruction.

The invention claimed is:

1. A method for routing a packet within a packet switching network in non-connected routing mode, implemented by a router, comprising:
    reading a field, called lifetime field of a received packet, intended to be decremented when passing through a router;
    decrementing the value of the lifetime field packet by a pitch of predetermined value, called decrementation pitch;
    decision on routing of the packet depending on the value of the decremented lifetime field packet, the packet being destroyed when said value is less than or equal to zero;
the method being characterized in that it furthermore comprises, prior to the decrementation step, the following steps:
    obtaining lifetime field packet of the router for the packet;
    determining that the value of the pitch is augmented if the lifetime field packet is a tunnel whose destination is not a router directly neighboring the router.

2. A non-transitory computer readable storage medium comprising program instructions executable by a router to:
    obtain link information on an output interface of the router for a received packet;
    obtain lifetime field information from the packet;
    determine if the link information is a tunnel whose destination is not a router directly neighboring the router;
    augment a predetermined value called the decrementation pitch when the link is determined to be a tunnel;
    decrement a value of the lifetime field by the decrementation pitch when passing through the router; and
    wherein the program instructions are configured to destroy the packet when said value of the lifetime field is less than or equal to zero.

3. The non-transitory computer readable storage medium of claim 2, wherein the program instructions are further executable to determine the output interface communications protocol is Fast Reroute (FRR).

4. The non-transitory computer readable storage medium of claim 2, wherein the program instructions are further executable to determine the output interface communications protocol is Virtual Private Network (VPN) MPLS.

5. The non-transitory computer readable storage medium of claim 2, wherein the program instructions are further executable to determine the output interface communications protocol is Interior Gateway Protocol (IGP).

6. The method for routing a packet as claimed in claim 1, wherein, the output interface communications protocol is determined to be Fast Reroute (FRR).

7. The method for routing a packet as claimed in claim 1, wherein, the output interface communications protocol is determined to be a Virtual Private Network (VPN) MPLS.

8. The method for routing a packet as claimed in claim 1, wherein, the output interface communications protocol is determined to be Interior Gateway Protocol (IGP).

9. A router system designed to route packets within a communications network in non-connected mode comprising a processor; and a memory storing program instructions executable by the processor to:
  obtain link information on an output interface of the router system for a received packet;
  obtain lifetime field information from the packet;
  determine if the link information is a tunnel whose destination is not a router directly neighboring the router system;
  augment a predetermined value called the decrementation pitch when the link is determined to be a tunnel;
  decrement a value of the lifetime field by the decrementation pitch when passing through the router system; and
  wherein the program instructions are configured to destroy the packet when said lifetime field value is less than or equal to zero.

10. The router system of claim 9, wherein the program instructions are further executable to determine the output interface communications protocol is Fast Reroute (FRR).

11. The router system of claim 9, wherein the program instructions are further executable to determine the output interface communications protocol is Virtual Private Network (VPN) MPLS.

12. The router system of claim 9, wherein the program instructions are further executable to determine the output interface communications protocol is Interior Gateway Protocol (IGP).

* * * * *